Jan. 15, 1924.

G. J. RACKHAM

ENDLESS TRACK VEHICLE

Filed Jan. 16, 1923.

Inventor
George J. Rackham
by his Attorneys

Jan. 15, 1924. 1,480,692
G. J. RACKHAM
ENDLESS TRACK VEHICLE
Filed Jan. 16, 1923 4 Sheets-Sheet 2
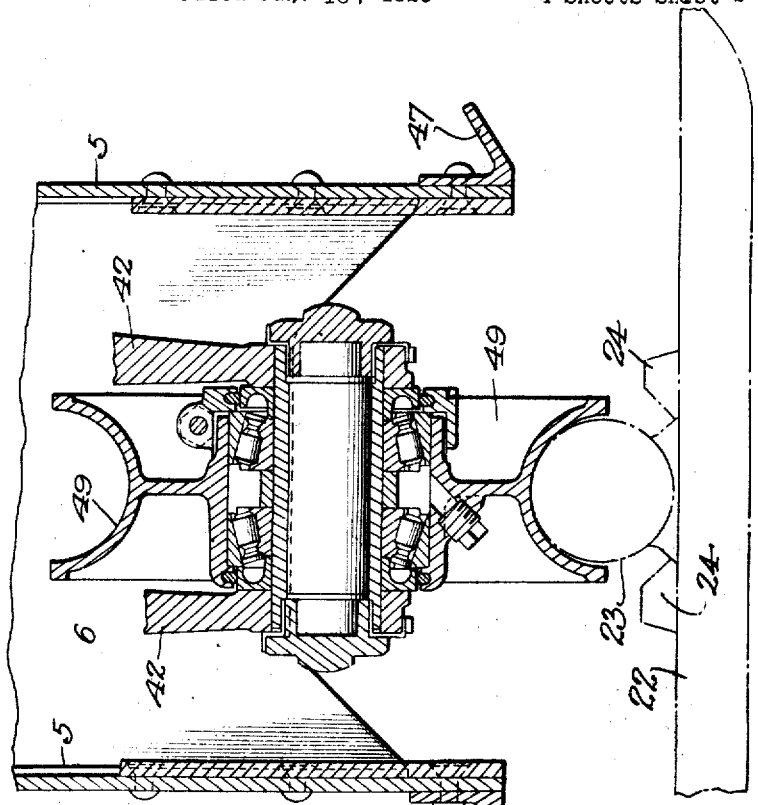
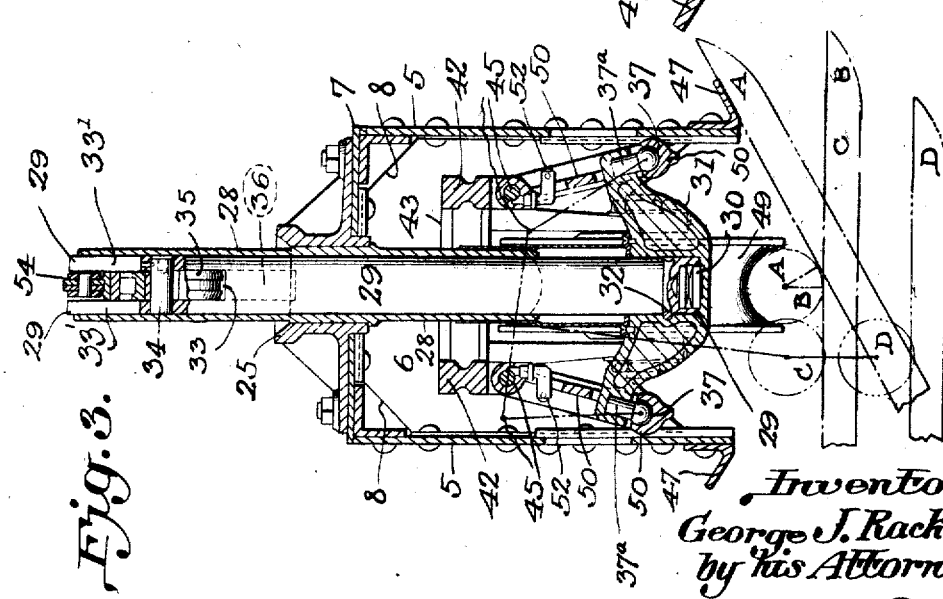
Fig. 4.
Fig. 3.
Inventor
George J. Rackham
by his Attorneys
Baldwin Wight Jan. 15, 1924. 1,480,692
G. J. RACKHAM
ENDLESS TRACK VEHICLE
Filed Jan. 16, 1923 4 Sheets-Sheet 3
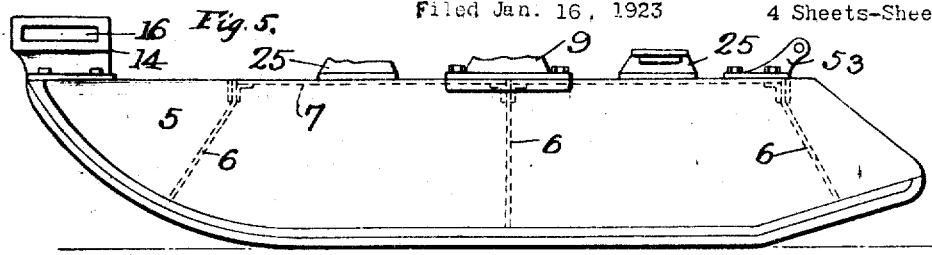
Fig. 6.
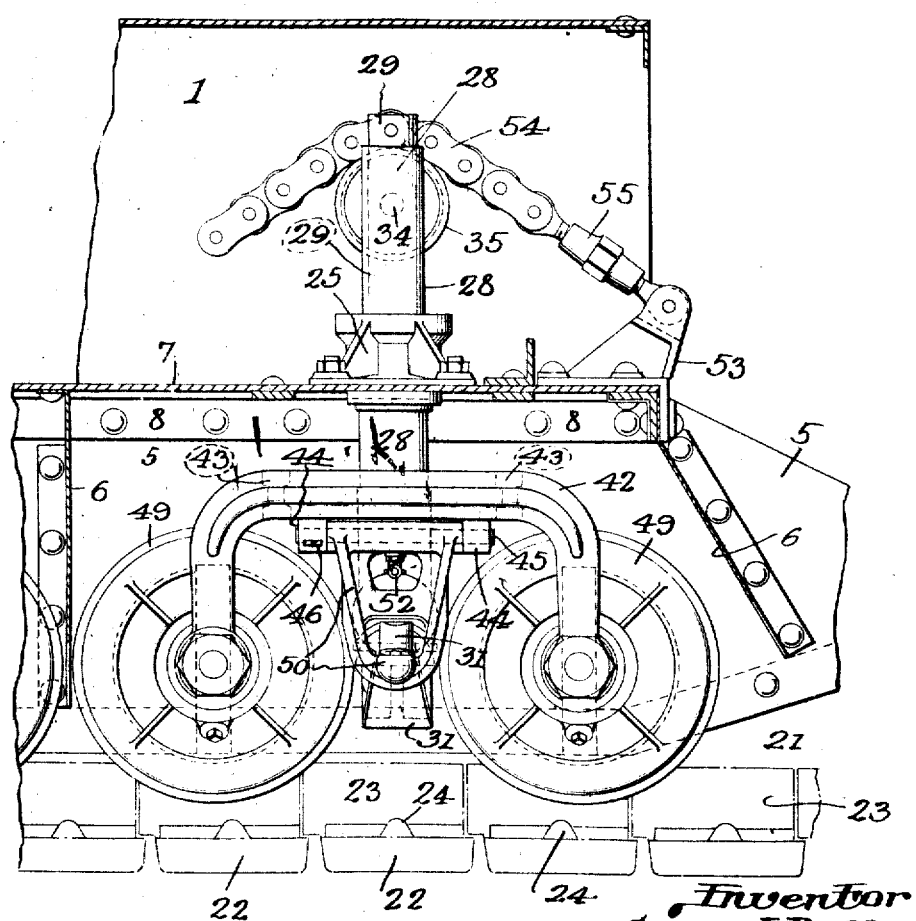
Inventor
George J. Rackham
by his Attorneys

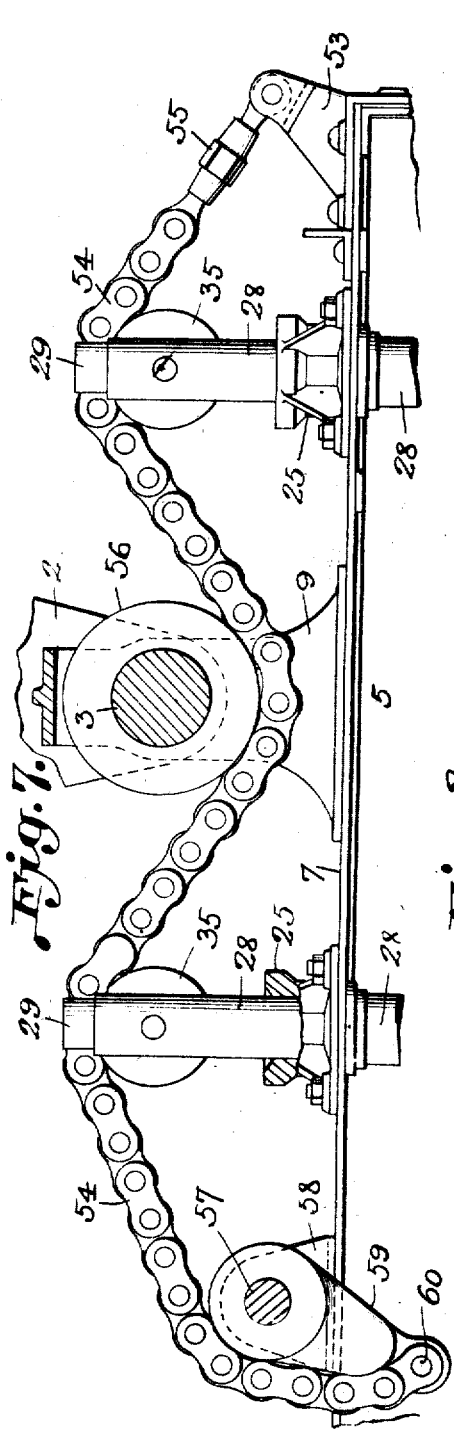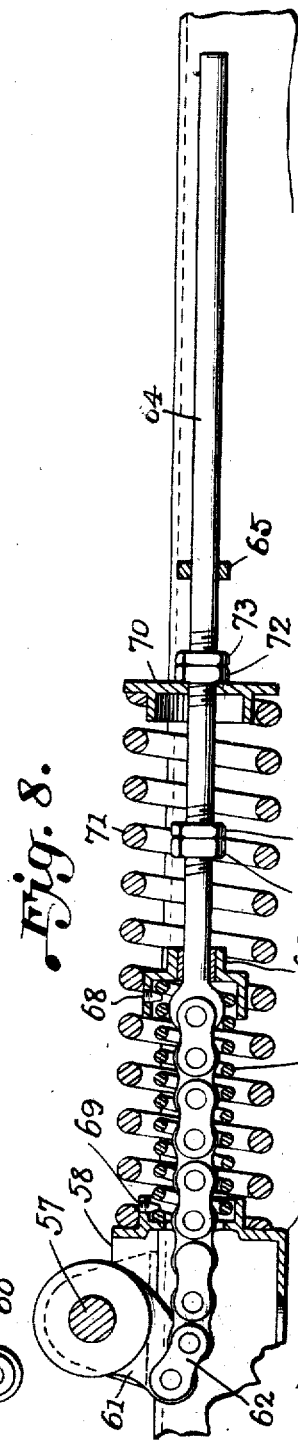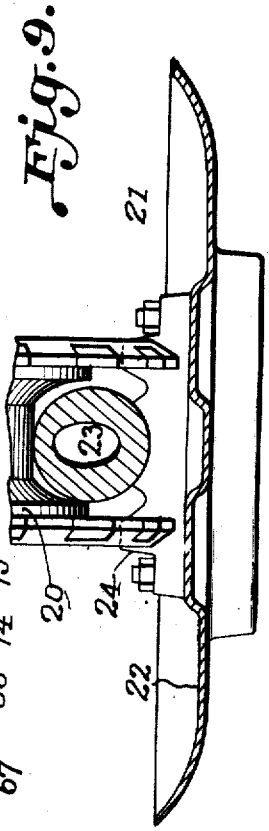

Patented Jan. 15, 1924.

1,480,692

UNITED STATES PATENT OFFICE.

GEORGE JOHN RACKHAM, OF CHICAGO, ILLINOIS, ASSIGNOR TO ROADLESS PATENTS HOLDING COMPANY, OF WASHINGTON, DISTRICT OF COLUMBIA.

ENDLESS-TRACK VEHICLE.

Application filed January 16, 1923. Serial No. 613,004.

*To all whom it may concern:*

Be it known that I, GEORGE JOHN RACKHAM, a subject of the King of Great Britain, residing in Chicago, county of Cook, and State of Illinois, have invented certain new and useful Improvements in Endless-Track Vehicles, of which the following is a specification.

This invention relates to vehicles of the class in which endless tracks or tractor belts are employed to sustain the vehicle and traverse the ground and particularly to that class of such vehicles known as "pilot half track machines" or those in which the front or steering wheels of the vehicle are of the ordinary kind while the rear portion of the vehicle is supported by endless tracks or tractor belts.

The object of this invention is to so construct the endless track mechanism that it may perform its functions with the greatest possible ease and without undue strain on the mechanism or abnormal shocks to the vehicle.

In carrying out my invention I provide a chassis of any suitable kind and I support the front end of the chassis in any suitable way, either by front steering wheels of ordinary construction such as are commonly used in half track machines, or I may use endless track mechanism at both ends of the chassis, or the entire chassis may be supported on the tractor mechanism. For convenience of illustration and description it may be assumed that the front end of the chassis is supported in any suitable way, the rear portion, however, being supported by my improved tractor mechanism.

The chassis has pivotally connected to its rear portion at each side a sub-frame which is mounted to rock about a horizontal axis preferably situated midway between its front and rear ends. Each of the sub-frames supports at its front end a pulley over which an endless tractor belt of suitable construction passes and by which the front portion of the belt is supported. Another tractor supporting pulley on each side of the vehicle is fixed to a rear shaft or axle mounted in bearings carried by the chassis and power from the motor is applied to said rear axle. Thus while the front portion of the track or belt may rise and fall relatively to the chassis, the rear portion thereof has a fixed relation thereto and the fixed axle always maintains a fixed relation with the driving mechanism. The weight of the vehicle is transmitted to the lower runs of the tractor belts through body supporting devices of novel construction carried by the sub-frames. These devices are of such construction and are so connected with the sub-frames and with the vehicle body that they may move vertically to a limited extent relatively to the chassis, may have a short fore and aft rocking movement in the sub-frames, and also a short lateral or transverse movement in said frames.

In this way the mechanism automatically accommodates itself to varying conditions and circumstances and assures the greatest ease of operation and freedom from shocks and strains.

The accompanying drawings show the preferred way of embodying my invention in machines of the kind before mentioned.

The remaining figures are on an enlarged scale.

Figure 1:
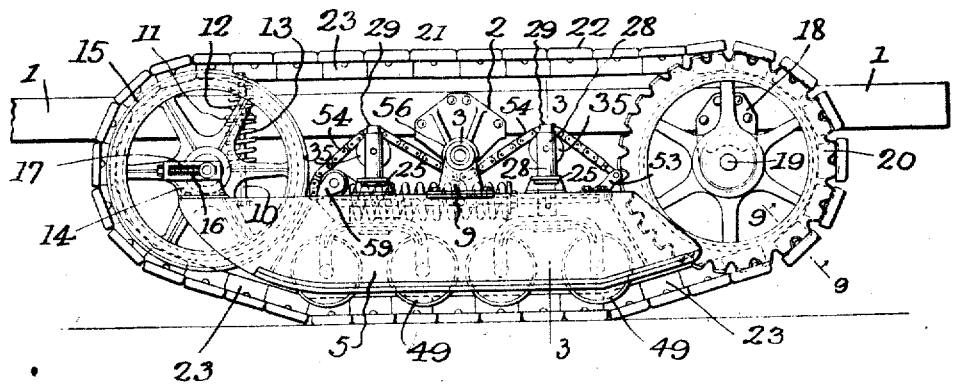
Figure 1 is a side elevation of the tractor mechanism at the rear end of the vehicle chassis.

Figure 3 is a detail view in section on the line 3—3 of Figure 1, showing particularly parts of one of the body supporting devices and the means employed for permitting lateral movement thereof.

Figure 4 is a detail view in section of one of the track wheels forming part of the body supporting devices and illustrates the manner in which it is mounted and how it engages the track.

Figure 5 is a side elevation of one of the sub-frames with parts of certain brackets carried thereby.

Figure 6 is a view in side elevation showing particularly the construction and manner of mounting one of the body supporting devices.

Figure 2:
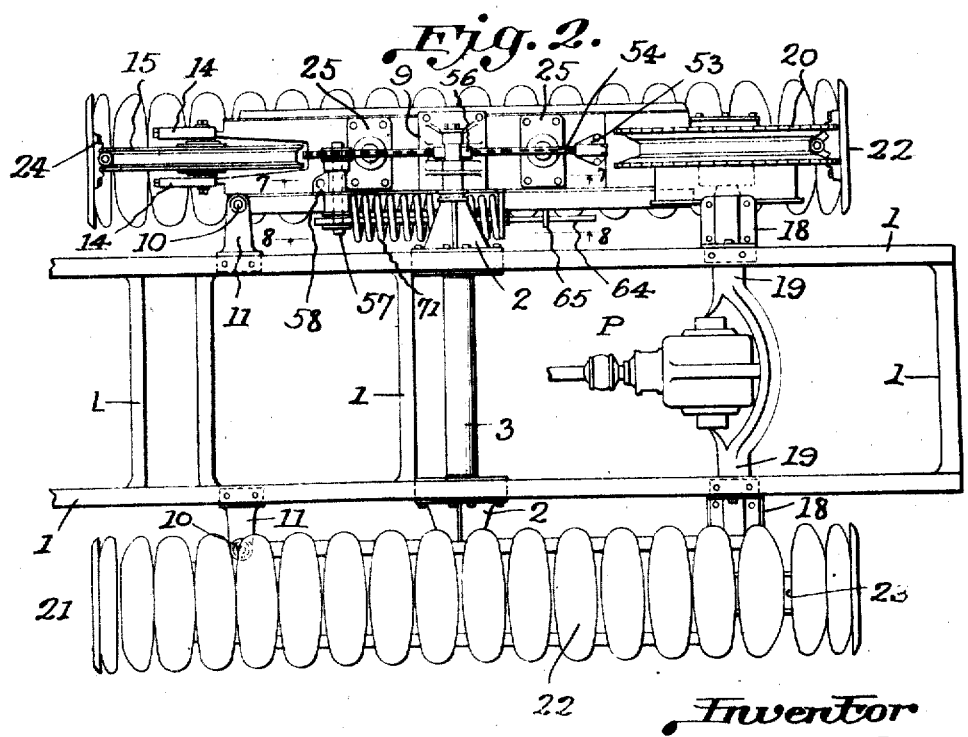
Figure 2 is a plan view of this mechanism on both sides of the chassis, the top run of the tractor belt on one side of the vehicle being omitted in order to show certain mechanism which would otherwise be hidden.

Figure 7 is a detail view in section on the line 7—7 of Figure 2 and shows particularly a part of the adjustable flexible suspension members on which the body rests.

Figure 8 is a view of another part of the suspending member shown in Figure 7.

Figure 9 is a detail view in section on the line 9—9 of Figure 1 showing the relation of one of the driving pulleys with the tractor belt.

The chassis of the vehicle as shown is in the form of a frame 1 which comprises longitudinal side members connected by transverse members disposed at suitable intervals. Brackets 2 bolted to the chassis support a shaft 3 from which is suspended on each side of the vehicle a sub-frame which is mounted to swing or turn about the axis of said shaft. Each of these sub-frames comprises two side plates 5 connected to a top plate 7 and spaced by intervening plates 6. Angle irons 8 are secured to the top plate and the side plates to strengthen the frame as shown in Figure 3. Each frame is open at the bottom and the top plate extends over a portion only of the frame, thus leaving open spaces at the ends of the frame to accommodate parts of the tractor pulleys in the manner shown.

The connection between each sub-frame and the shaft 3 is made by means of a bracket 9 bolted to the sub-frame and pivotally connected with the axle. The brackets 9 as shown in Figure 2 are disposed in vertical planes beyond or on opposite sides of the brackets 2 and the shaft 3 is prolonged beyond the brackets 2 to engage the brackets 9.

In operation the front end of the tractor mechanism tends to rise and in order to preserve a proper normal position of the sub-frames relatively to the chassis I provide on each side of the vehicle springs 12 and 13 surrounding a rod 10 secured to the associated sub-frame and extending through a bracket 11 projecting laterally from the chassis. The springs 13 are interposed between the sub-frames and the brackets 11 and while yielding to permit the front ends of the tractor belts to rise when encountering obstructions serve to ordinarily hold the frames in normal position.

The front portion of each tractor belt engages a pulley 15 mounted in bearings in brackets 14 carried by the front end of the associated sub-frame. These brackets are slotted as indicated at 16 and are provided with adjusting devices 17 by means of which the position of the pulleys may be changed to vary the tension of the belts in well known ways.

It will be observed that each front pulley 15 is mounted on a sub-frame which rocks independently of the sub-frame on the opposite side of the vehicle about an axis intermediate its front and rear ends. The rear pulley 20 on each side of the vehicle is secured to a driving axle 19 mounted in bearings in brackets 18 attached to the side members of the chassis. Power is applied to the axle 19 in any suitable way as indicated at P in Figure 2.

Each tractor belt 21 may be of any usual or suitable construction so far as my present invention is concerned. The belts shown each consists of shoes 22 connected by links 23 in such manner as to permit such freedom of movement that the tracks may be bent when passing the pulleys and may be also bent laterally to accommodate certain conditions. These links 23 may be tubular as indicated in Figure 9, and they are preferably of the general kind shown in my Patent No. 1,434,630 of Nov. 7, 1922 and also in my Patent 1,440,243 of December 26, 1922. The rear or driving pulleys 20 are preferably sprocket pulleys, being provided with teeth which engage lugs 24 on the shoes 22 as indicated in Figure 9. In this way the vehicle is supported on the lower runs of the belts. Provision is made for a vertical movement of each body supporting device in the sub-frame and for a transverse or lateral movement therein. More specifically, each body supporting device comprises wheels 49 mounted in parallel inverted U shape frame members 42 connected by cross bars 43. Each wheel is mounted in suitable bearings in the lower ends of the arms of a frame as shown in Figure 4.

The frames 42 are arranged between the side plates 5 of the sub-frames and the top of each sub-frame is equipped with brackets 25 having central openings through which extend guide sleeves 28 which are fixed to said brackets and extend a considerable distance above them, and also extend downwardly into the frames 42. These sleeves serve as guides for the vertical posts 29 which have endwise movement in the sleeves.

The posts 29 are recessed on their lower ends and rest on thrust bearings 30 in post supports 31. The posts are connected with the post supports by pins 32 extending from the supports into annular grooves in the posts.

The post supports 31 are suspended from the frames 42 by hangers 50 which are pivotally connected to the frames 42 by pins 45 extending through lugs 44 of said frames and through the upper portions of the hangers. The hanger bearings may be lubricated in the manner indicated at 52 and the pins 45 may be keyed to the frame as indicated at 46.

At their lower ends the hangers extend under arms of the post supports and are connected thereto by balls 37 on the ends of plugs 37ª fitted in the post supports. At its upper end each post 29 is slotted at 33. The sleeve 28 is similarly sloted at 36 and in the slotted portion of each post and sleeve is mounted a pulley 35 pivoted at 34 to the post. By this construction the post and its pulley may move vertically to a limited extent in the associated sleeve. In this way the body supporting devices may move vertically in the sub-frames and are properly guided when so doing. The lower parts of the hangers have no sidewise movement in the sub-frames but the upper portions of these hangers may be moved sidewise or laterally about the balls 37 and thus a sidewise or lateral movement is given to the frames 43 which carry the wheels 49 so that when the track belts are moved laterally the wheels 49 move with them. The upper portions of the frames 42 may also rock fore and aft in the sub-frames about the ball and socket joints 37 thus giving a rocking movement to the wheels 49.

The manner in which the posts 45 are shifted sidewise is indicated diagrammatically in Figure 3.

The body supporting devices, therefore, have a fore and aft movement with the sub-frames when they swing on the shaft 3, a vertical movement in the sleeves 28, and a rocking and sidewise movement on the ball and socket joints 37.

The shoes of the tractor belts may turn about the axes of the links 23 in the manner indicated at A in Figure 3, this pivotal movement being limited by flanges 47 on the lower ends of the side plates 5.

It will be observed by reference to Fig. 3 that in the special construction illustrated the hangers 50 are inclined from top to bottom downwardly in opposite directions so that when the frames 43 are swung laterally they are also given an angular or tilting movement, indicated by the dash lines in Fig. 3, which results in tilting the axes of the wheels 49.

The shaft 3 carried by the chassis is equipped on each side with a pulley 56 which rests on a rope, cable or chain 54 mounted on the sub-frame. The rear end of the chain is connected to a bracket 53 on top of the sub-frame and the chain after passing across the pulleys 35 of the posts 29 and under the pulley 56 of the shaft 3 is attached to an arm 60 associated with a cam 59 on a short shaft 57 mounted in a bracket 58 on the sub-frame. The chain may be provided with a turn-buckle 55 for adjusting its length. The arm 60 is connected with a short length of chain 62 attached to a horizontally arranged rod 64 supporting a cup 70 against which bears one end of a stout coiled spring 71, the opposite end of which rests against a supporting bracket 58 on the sub-frame. The rear portion of the rod 64 is guided by a bracket 65 and by means of the nuts 72 and 73 the tension of the spring 71 may be adjusted to correspond with the weight or load carried and to hold the chain 54 in normal position. The front end of the rod 64 carries a cup 66 into which extends the rear end of a relatively small spring 67, the front end of which extends into the cup of the bracket 58. Screws 68, 69 hold the spring 67 in place between the cups 66 and 70. The rod 64 carries adjustable nuts or stops 74, 75. The spring 71 is under tension and the spring 67 is put under tension only when the chain 54 is put under unusual tension and pulls on the rod to an abnormally increased extent. Normally when the chain 54 is raised by a post 29, the spring 71 is compressed, the nuts 72, 73 pressing against the cup 70 but when the rod 64 is moved to such an extent as to cause the nuts 74 to engage and move the cup 66, the auxiliary spring 67 will be compressed.

In this way one of the posts may be raised and lift that part of the chain with which it is associated without moving other portions of the chain. The cam 59 remains in contact with the chain at all times. While I prefer to use the flexible spring controlled suspension member shown I do not limit my claims to such mechanism as the posts may be connected with the chains in other well known ways.

Certain features of the invention shown in the accompanying drawings and hereinbefore described are claimed in an application of George John Rackham & Frederick Briddon Lamb, filed Mar. 17, 1923, No. 625,751, the subject matter of these claims being the joint invention of said Rackham & Lamb and said joint application being founded on an application for patent filed in Great Britain on Apr. 18, 1922.

I claim as my invention:—

1. An endless track vehicle comprising tractor belts, driving and idle pulleys supporting them, a vehicle body, a sub-frame connected therewith mounted to rock fore and aft, and means for supporting the vehicle body comprising wheels engaging the lower runs of the belts, frames in which the wheels are mounted, cables connected with the sub-frames on which the vehicle body rests, and vertically movable connections between the frames of the track-engaging wheels and said cables which also permit the frames to swing bodily sidewise or laterally with the tractor belts.

2. An endless track vehicle comprising a chassis, subframes supported from opposite sides thereof and each mounted to rock fore and aft about an axis intermediate its front and rear portions, tractor belts on opposite sides of the vehicle, pulleys for the belts carried by the front portion of the subframes, pulleys for the rear portions of the belts carried by the chassis, body supporting devices connected with the chassis for vertical and lateral movement and carried by and within the subframe and which rock with said subframes about their pivotal connection with the chassis.

3. An endless track vehicle comprising a chassis, subframes supported from opposite sides thereof and each mounted to rock fore and aft about an axis intermediate its front and rear portions, tractor belts on opposite sides of the vehicle, pulleys for the belts carried by the front portions of the subframes, pulleys for the rear portions of the belts carried by the chassis, body supporting wheels engaging the lower runs of the belts, frames within the subframes in which the wheels are mounted, flexible cables connected with the subframes on which the vehicle body rests and vertically movable connections between the frames of the body-supporting wheels and said cables which also permit the frames to swing sidewise or laterally with the tractor belts.

4. An endless track vehicle comprising a chassis, subframes suspended therefrom, tractor belts on opposite sides of the vehicle, pulleys for the belts mounted to operate above the lower runs of the belts and body supporting devices housed within the subframes which engage the belts and are mounted to move vertically and also swing laterally within the sub-frames.

5. An endless track vehicle comprising a chassis, subframes suspended therefrom, tractor belts on opposite sides of the vehicle, pulleys for the belts mounted to operate above the lower runs of the belts, and body supporting devices in the subframes, each comprising a vertically movable post, a support on which the post rests, a frame sustaining the post support and which rocks laterally with respect to the post support, and wheels carried by said frame adapted to engage the belt with which it is associated.

6. An endless track vehicle comprising a chassis, subframes suspended therefrom, tractor belts on opposite sides of the vehicle, pulleys for the belts and body supporting devices carried by the subframes, each comprising a vertically movable post, a post support on which the post rests, a frame supporting the post support and which moves laterally and rocks in the subframe and wheels carried by said frame adapted to engage the track.

7. An endless track vehicle comprising a chassis, subframes suspended from opposite sides thereof and each mounted to rock fore and aft about an axis intermediate its front and rear portions, tractor shoes connected by universal joints adapting the track to flex laterally and the shoes to rock sidewise about horizontal axes, pulleys for the belts carried by the subframes and the chassis and body supporting devices carried by the subframes interposed between the vehicle body and the lower runs of the belts, comprising flexible suspending members connected with the sub-frames on which the vehicle body rests, wheels engaging the tracks, frames carried by the sub-frames in which the wheels are mounted and which are mounted to move laterally or sidewise with the tracks, and connections between said frames and said flexible suspending members.

In testimony whereof, I have hereunto subscribed my name.

GEORGE JOHN RACKHAM.